United States Patent
Okandan et al.

(10) Patent No.: US 8,205,497 B1
(45) Date of Patent: Jun. 26, 2012

(54) MICROELECTROMECHANICAL INERTIAL SENSOR

(75) Inventors: Murat Okandan, Edgewood, NM (US); Gregory N. Nielson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 572 days.

(21) Appl. No.: 12/398,559

(22) Filed: Mar. 5, 2009

(51) Int. Cl.
G01P 15/093 (2006.01)

(52) U.S. Cl. .................................... 73/514.26

(58) Field of Classification Search .............. 73/514.26, 73/504.01, 514.19, 653; 359/566–569; 250/227.14, 250/231.1
See application file for complete search history.

(56) References Cited

U.S. PATENT DOCUMENTS

| | | | |
|---|---|---|---|
| 4,239,963 A * | 12/1980 | August et al. | 73/514.26 |
| 4,306,456 A * | 12/1981 | Maerfeld | 73/514.28 |
| 5,493,577 A | 2/1996 | Choquette et al. | |
| 5,568,499 A | 10/1996 | Lear | |
| 5,650,568 A | 7/1997 | Greiff et al. | |
| 5,936,294 A * | 8/1999 | Zhang | 257/435 |
| 5,978,401 A | 11/1999 | Morgan | |
| 6,350,983 B1 * | 2/2002 | Kaldor et al. | 250/231.1 |
| 6,473,187 B1 * | 10/2002 | Manalis | 356/521 |
| 6,550,330 B1 * | 4/2003 | Waters et al. | 73/514.26 |
| 6,763,718 B1 * | 7/2004 | Waters et al. | 73/514.26 |
| 7,091,715 B2 * | 8/2006 | Nemirovsky et al. | 73/514.26 |
| 7,116,430 B2 | 10/2006 | Degertekin et al. | |
| 7,339,738 B1 * | 3/2008 | Carr et al. | 359/569 |
| 7,440,117 B2 | 10/2008 | Degertekin et al. | |
| 7,542,188 B2 * | 6/2009 | Zhou et al. | 359/199.1 |
| 7,980,115 B2 * | 7/2011 | Stewart et al. | 73/1.38 |
| 2007/0165896 A1 | 7/2007 | Miles et al. | |

* cited by examiner

Primary Examiner — Helen C. Kwok
(74) Attorney, Agent, or Firm — Lowell Carson

(57) ABSTRACT

A microelectromechanical (MEM) inertial sensor is disclosed which can be used to sense a linear acceleration, or a Coriolis acceleration due to an angular rotation rate, or both. The MEM inertial sensor has a proof mass which is supported on a bridge extending across an opening through a substrate, with the proof mass being balanced on the bridge by a pivot, or suspended from the bridge by the pivot. The proof mass can be oscillated in a tangential direction in the plane of the substrate, with any out-of-plane movement of the proof mass in response to a sensed acceleration being optically detected using transmission gratings located about an outer edge of the proof mass to generate a diffracted light pattern which changes with the out-of-plane movement of the proof mass.

22 Claims, 12 Drawing Sheets

MICROELECTROMECHANICAL INERTIAL SENSOR

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical inertial sensors, and in particular to a microelectromechanical accelerometer and angular rotation rate sensor which utilizes an oscillating proof mass supported by a centrally-located pivot with transmission gratings being located proximate to the proof mass to optically detect an acceleration and an angular rotation rate by movement of the proof mass relative to the transmission gratings.

BACKGROUND OF THE INVENTION

Microelectromechanical (MEM) inertial sensors are being developed for use in the navigation, automotive and consumer areas (e.g. computer joysticks and game controllers). The present invention provides a MEM inertial sensor which uses optical interferometry to sense a linear acceleration and angular rotation rate about one or two axes using an oscillating proof mass which is supported on a centrally-located pivot. This is an advance over prior art MEM inertial sensors which have heretofore been only capable of sensing linear acceleration or an angular rotation rate, but not both.

These and other advantages of the present invention will become evident to those skilled in the art.

SUMMARY OF THE INVENTION

The present invention relates to a microelectromechanical (MEM) inertial sensor which comprises a substrate, and a bridge which extends across an opening formed through the substrate. A proof mass is located in the opening, with the proof mass being formed, at least in part, from the substrate. A pivot is located between the proof mass and the bridge to support the proof mass at a midpoint of the bridge. The MEM inertial sensor also includes one or more transmission gratings which are located proximate to the proof mass near an outer edge thereof. A laser (e.g. a vertical-cavity surface-emitting laser also referred to herein as a VCSEL) in the MEM inertial sensor provides light which is transmitted through each transmission grating and reflected off of a surface of the proof mass to generate a diffracted light pattern. This diffracted light pattern changes with a movement of the proof mass which can occur in response to a sensed acceleration which is directed along a z-axis perpendicular to the substrate (i.e. perpendicular to a major surface of the substrate) or at an angle to the z-axis. A plurality of photodetectors in the MEM inertial sensor can be located proximate to each laser to detect the diffracted light pattern and to generate electrical output signals to provide an indication of the sensed acceleration. The substrate can comprise silicon (e.g. a bulk silicon substrate or a silicon-on-insulator substrate).

A plurality of electrodes can be provided in the MEM inertial sensor above and below the proof mass proximate to the outer edge thereof. This is useful to provide electrostatic forces to urge the proof mass to move upward or downward (e.g. to adjust a spacing between the proof mass and the transmission gratings, or to operate the MEM inertial sensor in a force balance feedback mode).

A plurality of electrostatic actuators can also be located about the outer edge of the proof mass to urge the proof mass to oscillate about the z-axis in a tangential direction. By oscillating the proof mass, an angular rotation rate can be sensed through the generation of a Coriolis acceleration (also referred to as a Coriolis force) which acts upon the proof mass to tilt the proof mass at an angle to the z-axis which depends upon the angular rotation rate.

In certain embodiments of the present invention, the MEM inertial sensor can further comprise an electrode located beneath each transmission grating to electrostatically change a spacing between that transmission and the proof mass in response to a voltage applied between the transmission grating and the electrode located therebeneath. This can provide a control of the spacing between the transmission grating and the proof mass which is independent of any movement of the proof mass.

The proof mass can further comprise tungsten. This is useful to increase the mass of the proof mass, or to provide a center of mass of the proof mass which is located near the pivot.

In certain embodiments of the present invention, the pivot can have a tapered end (e.g. pointed or rounded) which contacts the bridge. This reduces a contact area of the pivot with the bridge to enable the proof mass to move more freely, with the proof mass being balanced on the bridge by the pivot. In these embodiments of the present invention, the bridge can comprise a layer of silicon nitride which is in contact with the tapered end of the pivot which can ride on the bridge without any attachment thereto. In other embodiments of the present invention, the pivot can be attached at one end thereof to the bridge, with another end of the pivot being attached to the proof mass by a plurality of springs.

The proof mass can also optionally include magnetic material which is responsive to an externally-applied magnetic field to move the proof mass. The externally-applied magnetic field can be produced by an electromagnet located proximate to the magnetic material. This can be useful to modulate a spacing between the proof mass and each transmission grating, or to operate the MEM inertial sensor in a force balance feedback mode which rebalances the proof mass by nulling out any movement of the proof mass due to a sensed acceleration.

The present invention also relates to a MEM inertial sensor which comprises a substrate having an opening therethrough, with a bridge extending across the opening. A proof mass is suspended in the opening by a pivot which contacts a midpoint of the bridge, with the pivot being aligned along a z-axis which is perpendicular to the substrate. One or more electrostatic actuators are located proximate to an outer edge of the proof mass to provide a oscillatory motion of the proof mass about the z-axis in a tangential direction. A plurality of transmission gratings are located near the outer edge of the proof mass, with a laser providing light which is transmitted through each transmission grating and reflected off of the proof mass. This produces a diffracted light pattern which changes with any movement of the proof mass in response to a sensed acceleration. A plurality of photodetectors are provided in the MEM inertial sensor to detect the diffracted light pattern and thereby generate electrical output signals to provide an indication of the sensed acceleration.

The substrate can comprise silicon. The proof mass can be formed, at least in part, from the substrate and can further comprise tungsten. In some embodiments of the present invention, the pivot can be tapered at an end thereof which contacts the midpoint of the bridge; whereas in other embodiments of the present invention, the pivot can be attached to the proof mass by a plurality of springs.

A plurality of electrodes can be located above and below the proof mass proximate to the outer edge thereof to provide electrostatic forces to urge the proof mass to move upward or downward. This can be useful to operate the MEM inertial sensor in a force balance feedback mode where any movement of the proof mass in response to a sensed acceleration is nulled.

In some embodiments of the present invention, the proof mass can include magnetic material which interacts with an externally-applied magnetic field to move the proof mass along the z-axis. This is useful, for example to modulate a spacing between the proof mass and each transmission grating, or to re-balance the proof mass in response to a sensed acceleration.

The present invention further relates to a MEM inertial sensor which comprises a proof mass formed, at least in part, from a portion of a substrate. The proof mass is centered about a z-axis which is perpendicular to the substrate, with the proof mass being moveable along the z-axis or at an angle thereto in response to a sensed acceleration. To provide for movement of the proof mass, the proof mass is supported by a bridge, which spans an opening through the substrate, and also by a pivot which is located between the bridge and the proof mass and aligned along the z-axis. A plurality of transmission gratings are located proximate to an outer edge of the proof mass and uniformly spaced around the outer edge. A plurality of parallel-plate electrostatic actuators are provided in the MEM inertial sensor and spaced about the proof mass to electrostatically adjust a spacing between the proof mass and the plurality of transmission gratings. A plurality of electrostatic actuators located proximate to the outer edge of the proof mass oscillate the proof mass about the z-axis in a tangential direction. A plurality of lasers in the MEM inertial sensor each provide light which is transmitted through one of the transmission gratings and reflected off of the proof mass. This produces a diffracted light pattern from each transmission grating which changes with a movement of the proof mass in response to the sensed acceleration and which can be detected with a plurality of photodetectors to generate electrical output signals that can be used to determine the sensed acceleration.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
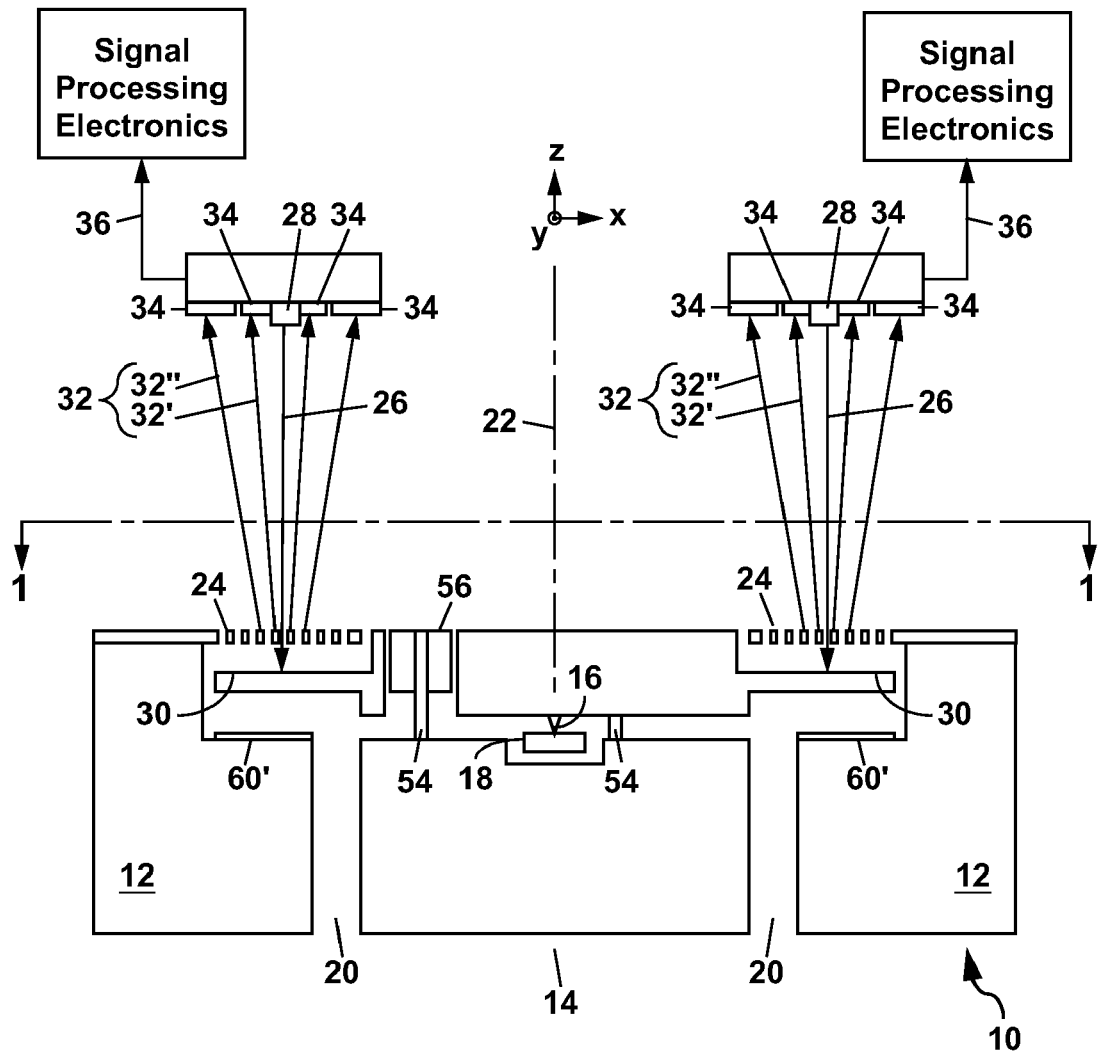
FIG. 1 shows a schematic cross-section view of a first example of a MEM inertial sensor according to the present invention.

Referring to FIG. 1, there is shown a schematic cross-section view of a first example of a microelectromechanical (MEM) inertial sensor 10 formed according to the present invention. The MEM inertial sensor 10 comprises a substrate 12 having a proof mass 14 which is formed, at least in part, from the substrate 12. The proof mass 14 is supported for movement by a pivot 16 which contacts a bridge 18 at a midpoint thereof, with the bridge 18 extending across an opening 20 through the substrate 12.

With the proof mass 14 balanced on the bridge 18 by the pivot 16, which can be tapered as shown in FIG. 1, the proof mass 14 can move along a z-axis 22 or at an angle relative to the z-axis 22 in response to a sensed acceleration which acts upon the proof mass 14. The sensed acceleration can be a linear acceleration, or a Coriolis acceleration, from which an angular rotation rate of the sensor 10 can be determined, or both. To measure a Coriolis acceleration, the proof mass 14 can be oscillated about the z-axis 22 in tangential direction (indicated by a double-headed arrow in FIG. 2).

In response to a linear acceleration directed along the z-axis 22, the proof mass 14 can move either upwards or downwards along the z-axis 22 depending upon the direction of the linear acceleration. When the linear acceleration is directed downward towards the bottom of the page in FIG. 1, the bridge 18 acts as a leaf spring and will bow downward to allow the proof mass 14 to move downward. When the linear acceleration is directed upward towards the top of the page in FIG. 1, proof mass 14 can move upward while still being supported on the pivot 18 or, if the acceleration is large enough, the proof mass 14 and pivot 18 can be raised above the bridge 18.

To sense an angular rotation rate, the proof mass 14 can be oscillated about the z-axis 22. When this is done, a rotation of the MEM inertial sensor 10 about the x-axis in FIG. 1 will generate a Coriolis acceleration (also termed a Coriolis force or torque) about the y-axis (i.e. perpendicular to the plane of FIG. 1) which will tilt the proof mass 14 about the y-axis and at an angle to the z-axis 22, with the exact tilt angle depending upon the angular rotation rate about the x-axis.

Figure 2:
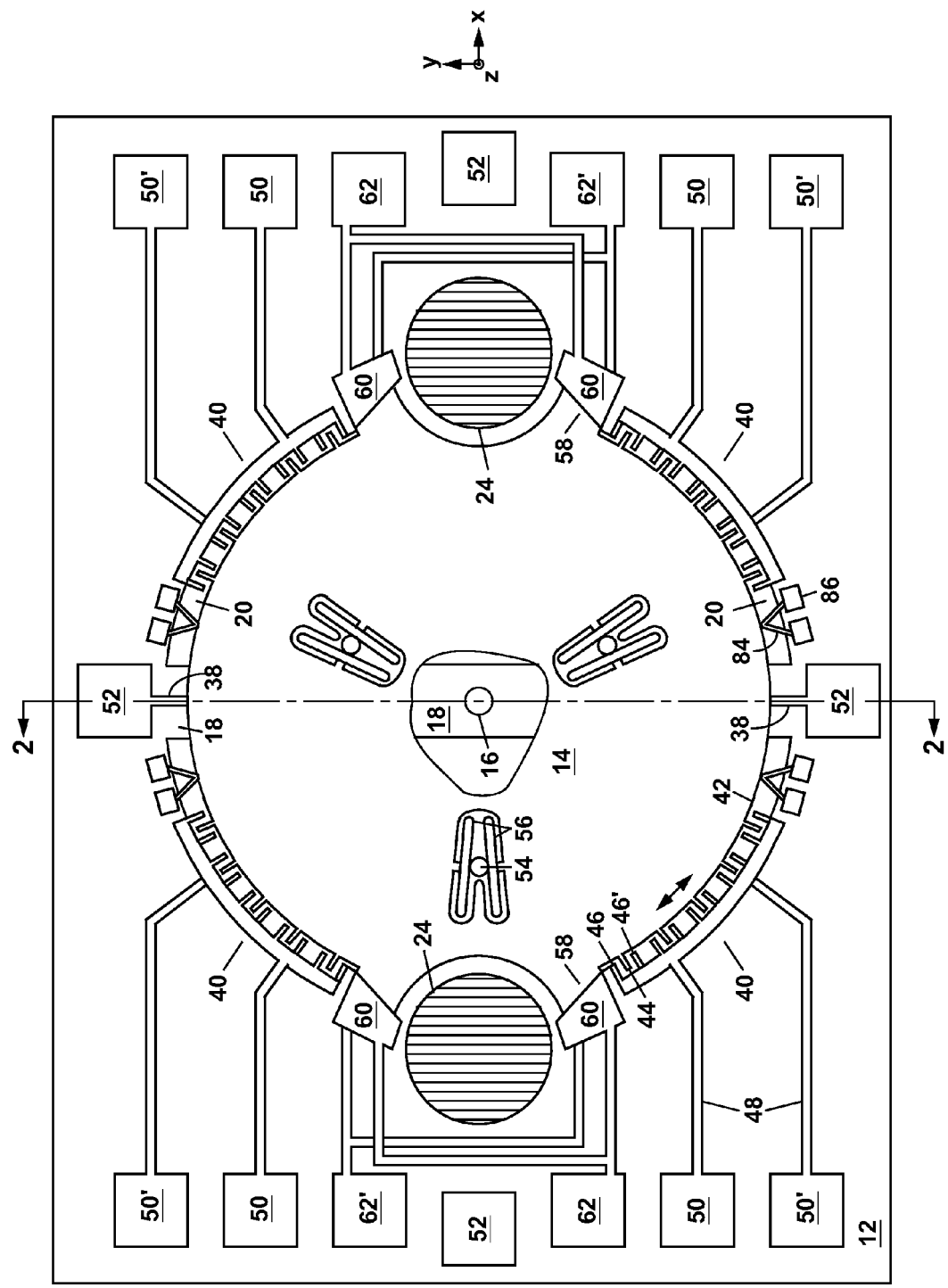
FIG. 2 shows a schematic plan view of a portion the MEM inertial sensor of FIG. 1 along the section line 1-1 in FIG. 1.

In the MEM inertial sensor 10 of FIG. 1, movement of the proof mass 14 is optically sensed. This can be done using one or more transmission gratings 24 which are located proximate to an outer edge of the proof mass 14 as shown in FIGS. 1 and 2. Light 26 generated by a laser 28 is incident on each transmission grating 24. This light 26 is partially transmitted through the transmission grating 24 and reflected from an underlying surface 30 of the proof mass 14, with some of the light 26 being directly reflected off of the transmission grating 24. The reflected light from the proof mass 14 and the transmission grating 24 interferes to produce a diffracted light pattern 32. The diffracted light pattern 32 can comprise an on-axis component 32' (also termed a 0-th order component) and/or a higher-order diffracted light component 32" which is directed at an angle to the incident light 26.

The 0-th order component 32' arises from a constructive interference of the light 26 which is reflected off of the transmission grating 24 and off of the surface 30 of the proof mass 14. Due to a divergence of the light 26 from the laser 28, the 0-th order component 32' is directed back towards the laser 28 as an expanded beam which can be detected by one or more photodetectors 34 which are located adjacent to the laser 28, or by an annular photodetector 34 which can surround the laser 28.

The higher-order diffracted light component 32" can be detected with additional photodetectors 34 that are spaced at a larger distance away from the laser 28 corresponding to the locations of the ±1 orders of the higher-order diffracted light component 32". Generally, only the ±1 orders of the higher-order diffracted light component 32" are detected although additional higher odd orders (e.g. ±3, ±5, ...) may be present in the higher-order diffracted light component 32". The photodetectors 34 provide electrical output signals 36 which can be used with signal processing electronics to provide an indication of the direction and magnitude of the sensed acceleration and/or angular rotation rate.

Movement of the proof mass 14 relative to the transmission gratings 24 in the example of FIG. 1 provides a very sensitive way of sensing any linear acceleration and/or angular rotation rate since the intensities of the 0-th and ±1 orders of the diffracted light pattern 32 change with a spacing between each transmission grating 24 and the underlying surface 30 of the proof mass 14. This change in intensity of the 0-th and ±1 orders in the diffracted light pattern 32 is periodic over a change in spacing equal to one-half wavelength (i.e. λ/2) of the incident laser light 26. In the case of a linear acceleration along the z-axis 22, the electrical output signals 36 generated by the photodetectors 34 on the two opposite sides of the MEM inertial sensor 10 in FIG. 1 will be in phase; whereas for a Coriolis acceleration due to a rotation about the y-axis in FIG. 1, the electrical output signals 36 from the photodetectors 34 on the opposite sides of the MEM inertial sensor 10 will be exactly 180° out of phase. This provides a simple way of separating the linear acceleration and angular rotation rate by summing and differencing the electrical output signals 36 from the photodetectors 34 and on opposite sides of the MEM inertial sensor 10.

FIG. 2 shows a schematic plan view of a portion of the MEM inertial sensor 10 along the section line 1-1 in FIG. 1 to show details of the proof mass 14 and the transmission gratings 24. In the schematic plan view of FIG. 2, a portion of the proof mass 14 has been cut away to show the location of the pivot 16 which is located in side the proof mass 14 and the bridge 18 which extends through the proof mass 14 with each end of the bridge 18 being attached to the substrate 12.

In this first example of the MEM inertial sensor 10, a spring 38 is provided on either side of the proof mass 14. The springs 38 are relatively compliant to allow the proof mass 14 to oscillate about the z-axis 22 in the tangential direction and to tilt about the y-axis while being stiff to resist any movement or tilting of the proof mass 14 about the x-axis.

A plurality of electrostatic actuators 40 are located about an outer edge 42 of the proof mass 14 to produce the oscillatory motion of the proof mass 14 about the z-axis 22 in a tangential direction indicated by a double-headed arrow in FIG. 2. Each electrostatic actuator 40 comprises a plurality of moveable electrodes 44 which extend out from the outer edge 42 of the proof mass 14 and which can be electrically grounded to the substrate 12 through the springs 38. A pair of stationary electrodes 46 and 46' is located on the substrate 12 about each moveable electrode 44 with the stationary electrodes 46 located on one side of each moveable electrode 44 being connected through electrical wiring 48 on the substrate 12 to a contact pad 50. The stationary electrodes 46' on an opposite side of each moveable electrode 44 are connected through additional electrical wiring 48 to a different contact pad 50'. A spacing between each moveable electrode 44 and an adjacent stationary electrodes 46 and 46' can be, for example, about 3 µm. The electrodes 46 and 46' can be formed as plates which can be, for example, about 10 µm square and about 1 µm wide in the tangential direction indicated by the double-headed arrow in FIG. 2.

The electrostatic actuators 40 can be activated to urge the proof mass 14 to move in a clockwise direction by applying a voltage of up to about 10 Volts between each contact pad 50 and one or more ground contact pads 52 which are connected through the substrate 12 to the moveable electrodes 44 on the proof mass 14. To move the proof mass 14 in a counterclockwise direction, a similar voltage can be applied between the contact pads 50' and 52. Electrical short circuiting of the electrodes 44 with the electrodes 46 and 46' can be prevented by either limiting the voltages applied to the electrostatic actuators 40 so that a movement of each electrode 44 is limited to about 1 µm. Alternately, mechanical stops (not shown) can be provided in the electrostatic actuators 40 to limit the movement of the electrodes 44 in the tangential direction to prevent them from coming into contact with the stationary electrodes 46 and 46' and generating an electrical short circuit.

With a periodic voltage applied to the electrostatic actuators 40, the proof mass 14 can be made to oscillate back and forth in the tangential direction. This oscillation of the proof mass 14 can be at a resonant frequency of the proof mass 14, or can be at an arbitrary frequency. The resonant frequency of the proof mass 14 can be on the order of a few kiloHertz or less for a proof mass 14 having a thickness of 0.2-0.7 millimeters (mm) and lateral dimensions in the range of 0.5 mm to several mm. The oscillation of the proof mass 14 in the tangential direction can be controlled with a feedback loop using one of the electrostatic actuators 40 to capacitively sense the oscillation of the proof mass 14 and provide a closed-loop feedback signal which can then be used to control the periodic voltage applied to the remainder of the actuators 40 which drive the oscillation of the proof mass 14.

Movement of the proof mass 14 in the clockwise direction can be on the order of about one degree, and the movement in the counterclockwise direction can being about the same. This oscillation of the proof mass 14 is responsible for generating the Coriolis acceleration which is necessary for sensing an angular rotation rate with the MEM inertial sensor 10.

To facilitate starting the oscillation of the proof mass 14, the proof mass 14 can be divided into an upper part and a lower part, with the lower part being located below the bridge 18 and with the upper part being located above the pivot 16 and bridge 18 and connected to the pivot 16 (see FIG. 1). These two parts of the proof mass 14 can be connected together using a plurality of posts 54 and springs 56. Each spring 56 can be formed, for example, as an elongate closed loop with one side of the closed-loop spring 56 being connected to one of the posts 54 and with the other side of the closed-loop spring 56 being connected to the upper part of the proof mass 14 as shown in FIG. 2. The lower part of the proof mass 14 is suspended from the posts 54.

This arrangement of the proof mass 14 in two parts makes it easier for the electrostatic actuators 40 to start the proof mass 14 oscillating since the electrostatic actuators 40 will initially only need to set the upper part of the proof mass 14 oscillating, and then the springs 56 will couple the oscillation of the upper part of the proof mass 14 to the lower part to set the lower part of the proof mass 14 into motion. After a period of time, both parts of the proof mass 14 will be oscillating in phase at the same oscillation frequency. This increases the time required to get the full proof mass 14 oscillating with both parts moving in unison, but reduces the force which needs to be supplied by the electrostatic actuators 40 for oscillating the proof mass 14.

In FIG. 2, a plurality of parallel-plate electrostatic actuators 58 can be provided on the substrate 12 proximate to the outer edge 42 of the proof mass 14 to electrostatically adjust a spacing between the proof mass 14 and the transmission gratings 24. Each parallel-plate electrostatic actuator 58 in the example of FIGS. 1 and 2 comprises a first pair of electrically-conductive electrodes 60 (also referred to herein as plates) which are located above the proof mass 14 and a second pair of electrically-conductive electrodes 60' (see FIG. 1) which are located beneath the proof mass 14. The proof mass 14 extends between the electrodes 60 and 60' and beneath the transmission gratings 24.

Each pair of the plates 60, which can comprise metal or doped polycrystalline silicon (also termed polysilicon) or a combination thereof, can be connected through wiring 48 to a contact pad 62, with the plates 60' being connected to another contact pad 62'. This allows each actuator 58 to be operated independently to generate an electrostatic force that urges the proof mass 14 upwards or downwards depending on a voltage applied between the proof mass 14 and a pair of plates 60 or 60' for that actuator 58. In this way, each parallel-plate electrostatic actuator 58 can be used to adjust the spacing between the proof mass 14 and the transmission gratings 24 to provide an operating point for the MEM inertial sensor 10 where the change in the diffracted light pattern 32 with a sensed acceleration is most sensitive and substantially linear. Such an operating point can be set, for example, so that the spacing between the transmission gratings 24 and the proof mass 14 is substantially equal to an odd multiple of $\lambda/8$ as described previously.

To adjust the spacing between the transmission gratings 24 and the proof mass 14, a direct-current (dc) voltage can be applied to either the first pair of plates 60 adjacent to each transmission grating 24 or to the second pair of plates 60', with the proof mass 14 being electrically grounded in each case. The dc voltage can be, for example, up to about 10 Volts. A small alternating-current (ac) voltage can also be applied to one of the pairs of plates 60 or 60' of each parallel-plate electrostatic actuator 58 to dither the spacing between the transmission gratings 24 and the proof mass 14 at a predetermined frequency to allow lock-in detection of the electrical output signals 36 from the photodetectors 34 to provide an improved signal-to-noise ratio in the MEM inertial sensor 10. This ac voltage can be, for example, 0.1-1 Volt. Electrical short-circuiting of the proof mass 14 to the plates 60 and 60' can be prevented by providing mechanical stops (not shown) to limit the movement of the proof mass 14 so that the proof mass 14 does not come into contact with the plates 60 and 60'.

The parallel-plate electrostatic actuators 58 can also be operated with closed loop feedback to re-balance the proof mass 14 after any movement thereof in response to a sensed acceleration, thereby nulling out the movement due to the sensed acceleration. This is useful to extend a dynamic range of the MEM inertial sensor 10 and also to maintain a high level of sensitivity and linearity for the sensor 10.

Fabrication of the MEM inertial sensor 10 of FIGS. 1 and 2 using a series of micromachining processing steps will be described hereinafter with reference to FIGS. 3A-3L which show schematic cross section views along the section line 2-2 in FIG. 2. Only those steps which are essential to the understanding of the present invention will be described in detail although those skilled in the art will understand that many other processing steps are required to fabricate the MEM inertial sensor 10 including repeated steps for depositing and photolithographically patterning a photoresist, developing the photoresist for use as an etch mask, stripping the etch mask after an etching step, cleaning the substrate 12. These omitted processing steps are well-known to those skilled in the art, and therefore need not be described herein.

Figure 3A:
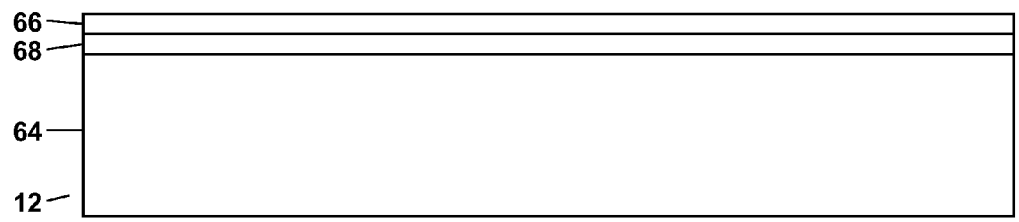
FIGS. 3A-3L show schematic cross-section views along the section line 2-2 in FIG. 2 to illustrate a series of process steps for fabricating the MEM inertial sensor of FIGS. 1 and 2.

In FIG. 3A, a semiconductor-on-insulator (SOI) substrate 12 is provided which comprises a bulk silicon portion 64 and a monocrystalline silicon layer 66 with an oxide layer 68 sandwiched therebetween. The bulk silicon portion 64 comprises monocrystalline silicon and can be, for example, 500-700 µm thick. The monocrystalline silicon layer 66 can be, for example, 1-30 µm thick; and the oxide layer 68 can be, for example, 1-2 µm thick. In other embodiments of the present invention, the substrate 12 can comprise a bulk silicon substrate.

Figure 3B:
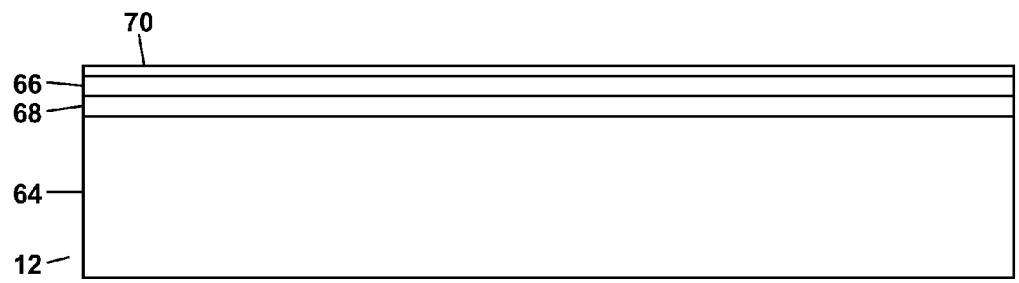

In FIG. 3B, a layer of silicon nitride 70 about 0.8 µm thick can be blanket deposited over the SOI substrate 12 by low-pressure chemical vapor deposition (LPCVD) at a temperature of about 850° C. The silicon nitride layer 70 will be used together with a portion of the monocrystalline silicon layer 66 to form the bridge 18. The silicon nitride layer 70 and the underlying monocrystalline silicon layer 66 can be patterned using reactive ion etching (RIE) to define the lateral shape of the bridge 18. The bridge 18 can be rectangular with a width of a few microns (µm) a thickness of, for example, 2-4 µm due to the combined thickness of the layers 66 and 70. The bridge 18 will span the opening 20 which will later be formed through the SOI substrate 12.

A layer of polysilicon (not shown) about 0.3 µm thick can then be blanket deposited over the SOI substrate 12 and patterned by a RIE step to form the plates 60' of the parallel-plate electrostatic actuators 58 and to build up the posts 54 which can be initially started in the silicon nitride layer 70. The contact pads 62' and wiring 48 to the plates 60' can also be formed from this polysilicon layer. This polysilicon layer and additional polysilicon layers described hereinafter can be deposited by LPCVD at a temperature of about 580° C. and can be doped during deposition using phosphorous to make the polysilicon layers electrically conductive. Each polysilicon layer described herein can also be annealed at a high temperature of about 1100° C. for several hours to reduce any residual stress therein. This annealing can be performed after each polysilicon layer has been encapsulated within an overlying layer of a sacrificial material 72.

Figure 3C:
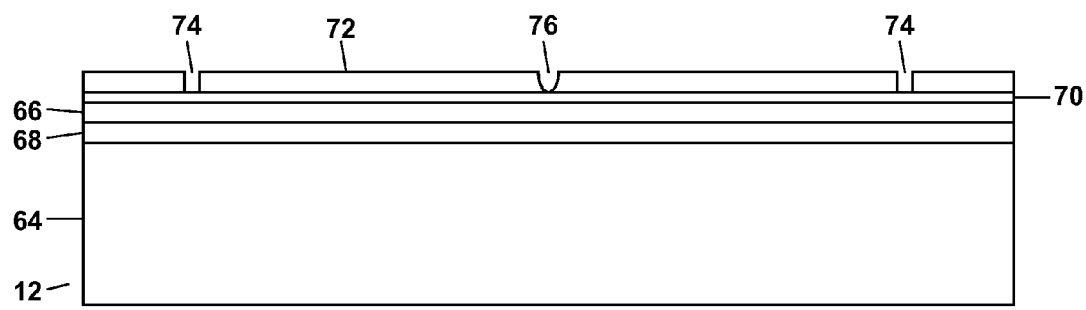

In FIG. 3C, a first layer of the sacrificial material 72 can be blanket deposited over the SOI substrate 12 by CVD. This layer of the sacrificial material 72, which can compromise silicon dioxide or a silicate glass such as tetra-ethyl-ortho-silicate (TEOS) which can be deposited by LPCVD at a temperature of about 750° C., can then be planarized by a chemical-mechanical polishing (CMP) step to provide a layer thickness of about 2 μm above the silicon nitride layer 70.

A plurality of openings can then be formed through the first layer of the sacrificial material 72. These openings include openings 74 with substantially straight sidewalls at locations where the posts 54 are being built up and at locations where portions of the first layer of the sacrificial material 72 will be encapsulated to form a part of the proof mass 12. These openings also include a tapered opening 76 which will be used to define the shape of the pivot 16. The openings 74 and 76 can be formed using different etching steps, with a RIE step being used to form the openings 74 with substantially straight sidewalls. The tapered opening 76 can be formed, for example, by another RIE step with the etching parameters being adjusted to provide a sidewall for the opening 76 which slopes or curves inward towards the center of the opening 76 as the etching proceeds. Alternately, an isotropic wet etching step (e.g. using an etchant comprising hydrofluoric acid) can be used to form the tapered opening 76, or to form a rounded bottom for an opening 76 which is initially partway formed by a RIE step.

Figure 3D:
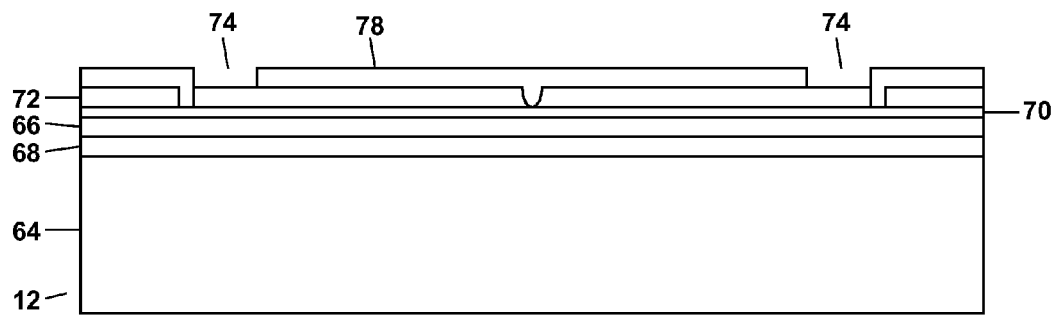

In FIG. 3D, one or more material layers 78 can be blanket deposited over the SOI substrate 12 and in the openings 74 and 76 to further build up the structure of the MEM inertial sensor 10 including the proof mass 14, the posts 54 and the pivot 16. These material layers 78 can comprise materials selected from the group consisting of polysilicon, silicon nitride, silicon dioxide, and silicate glass (e.g. TEOS). As an example, a 1-μm-thick polysilicon layer can be blanket deposited over the SOI substrate 12 followed by a 0.5-μm-thick TEOS layer and then followed by another polysilicon layer which is 1.5 μm thick to form the layers 78. As another example, a 0.8-μm-thick silicon nitride layer can be initially blanket deposited over the SOI substrate 12 followed by a 0.5-μm-thick TEOS layer and then followed by a 1.5-μm-thick layer of polysilicon to form the layers 78. Each of the above material layers 78 can be deposited by LPCVD.

After depositing the layers 78 in FIG. 3D, the layers 78 can be patterned by a RIE step to form additional openings 74 to define the shapes of the elements being built up from the layers 78, including the proof mass 14 and portions thereof which are used to form the electrodes 44 and to extend between the plates 60 and 60' and beneath the transmission gratings 24, and the electrodes 46 and 46'.

Figure 3E:
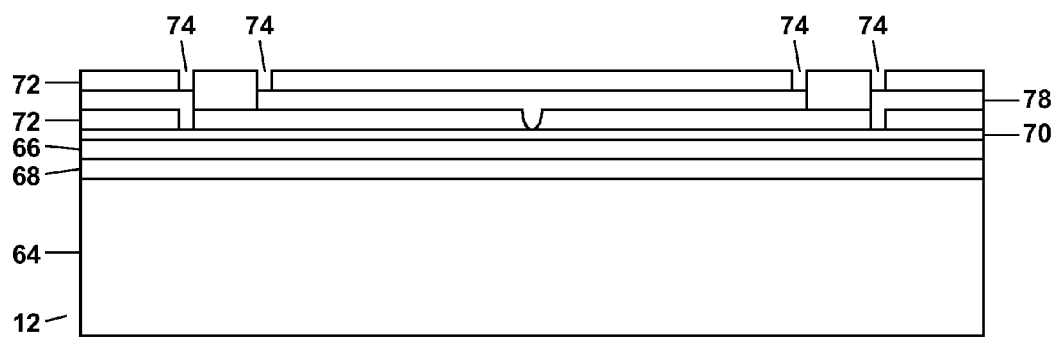
Figure 3F:
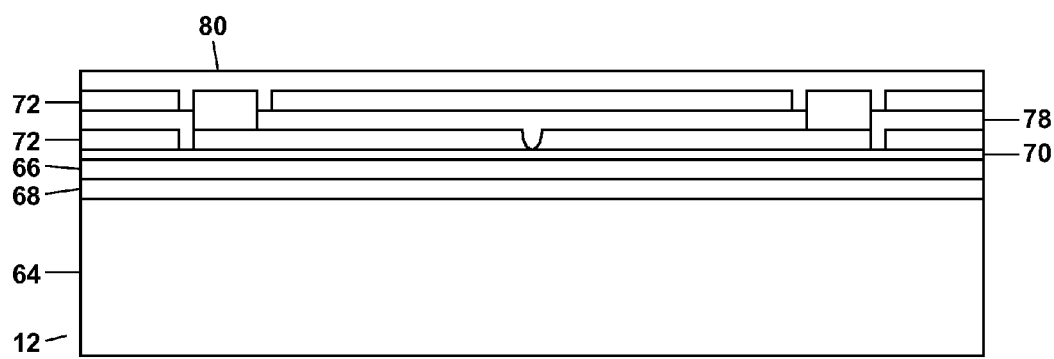

In FIG. 3E, yet another layer of the sacrificial material 72 can be blanket deposited over the SOI substrate 12 by CVD filling in the openings 74 through the layers 78. This layer of the sacrificial material 72 can then be planarized by a CMP step to provide a layer thickness of about 2 μm. Additional openings 74 can then be etched through this layer of the sacrificial material 72 using a RIE step in preparation for depositing another polysilicon layer 80. These openings 74 can provide for encapsulation of portions of the sacrificial material 72 within the polysilicon layer 80 shown in FIG. 3F, and also to allow the polysilicon layer 80 to be connected to the layers 78 to further build up elements of the MEM inertial sensor 10, including the electrodes 44, 46 and 46', the proof mass 14 and portions thereof which extend between the plates 60 and 60' and beneath the transmission gratings 24. The polysilicon layer 80, which can have a thickness of 2.25 μm, can also be used to build up the posts 54 and the springs 56, and to form the springs 38. After deposition of the polysilicon layer 80 by LPCVD and planarization by CMP, if needed, the polysilicon layer 80 can be patterned by another RIE step to define the various elements being formed in the layer 80.

Figure 3G:
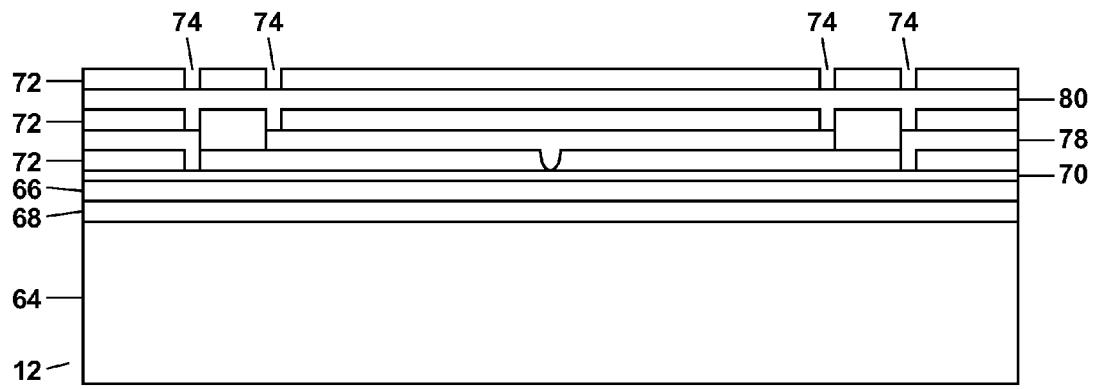

In FIG. 3G, another layer of the sacrificial material 72 can be blanket deposited over the SOI substrate 12 by LPCVD and then planarized using a CMP step. This layer of the sacrificial material 72 can be, for example, 2 μm thick. After deposition, this layer of the sacrificial material 72 can be patterned using a RIE step to form a plurality of openings 74 in preparation for deposition of a final layer 82 of polysilicon.

Figure 3H:
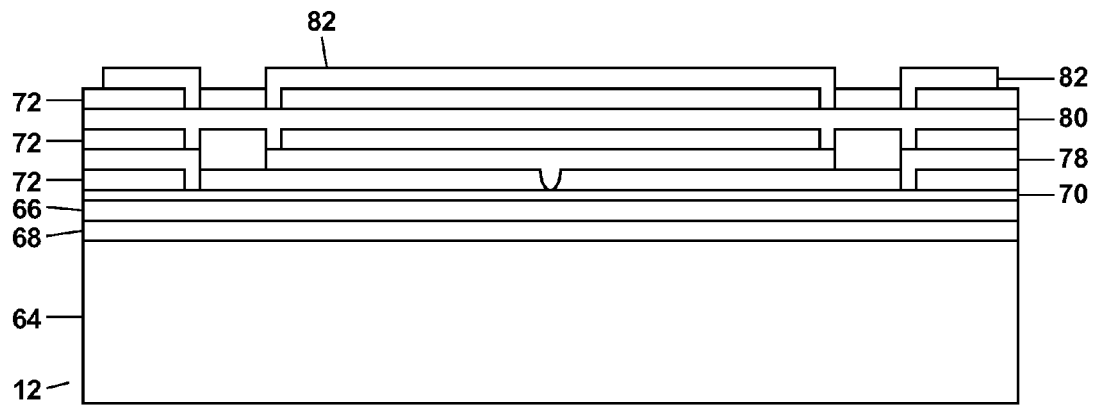

In FIG. 3H, the polysilicon layer 82 can be deposited over the SOI substrate 12 by LPCVD with a layer thickness of, for example, 2.25 μm. The polysilicon layer 82 can then be patterned using a RIE step to complete the build up the proof mass 14, the posts 40 and springs 56 connected thereto, and the electrodes 44, 46 and 46'. The polysilicon layer 82 can also be used to form the transmission gratings 24, the electrodes 60 and wiring 48 thereto, and the contact pads 50, 50', 52, 62 and 62'. The transmission gratings 24 comprise a plurality of parallel grating lines having a width of, for example, 1-2 μm, with the grating lines being formed from the layer 82 and with elongate openings being etched through the layer 82 between each adjacent pair of the grating lines. The width of the elongate openings in the transmission gratings 24 can be substantially equal to the width of the grating lines (see FIG. 1).

Figure 3I:
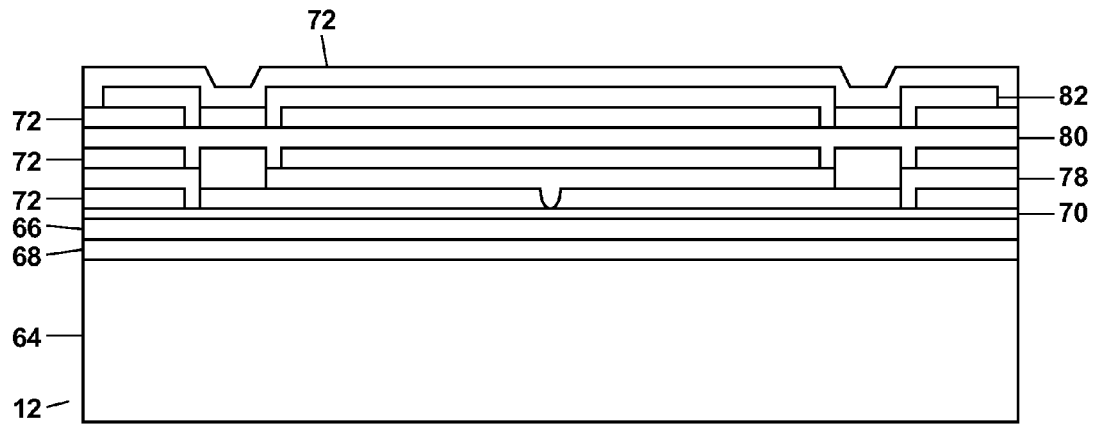

In FIG. 3I, a final layer of the sacrificial material 72 can be blanket deposited over the SOI substrate 12 by LPCVD. This final layer of the sacrificial material 72 need not be planarized. After deposition of the final layer of the sacrificial material 72, a final annealing step (e.g. at 1100° C. for 3 hours) can be used to relieve any stress in the various layers used to build up the structure of the MEM inertial sensor 10.

Figure 3J:
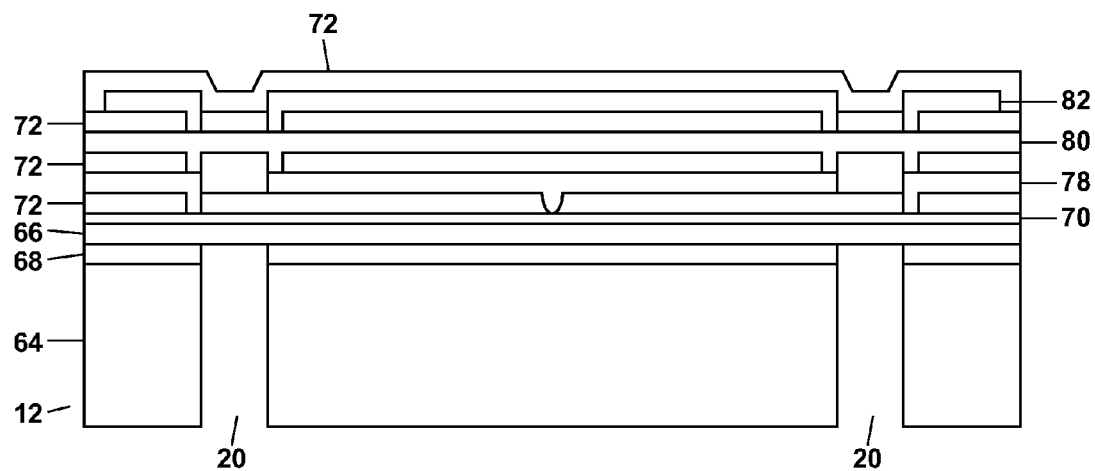

In FIG. 3J, a deep reactive ion etching (DRIE) step can be performed to etch the opening 20 through the bulk silicon portion 64 and the oxide layer 68 of the SOI substrate 12 from a bottom surface of the SOI substrate 12. The opening 20 can be an annular opening which is, for example, 10-100 μm wide depending upon the lateral dimensions of the proof mass 14 and the thickness of the SOI substrate 12. This DRIE step initiates a process of separating the proof mass 14 from a remainder of the SOI substrate 12. Deep reactive ion etching (also termed Bosch etching) is well-known in the art (see e.g. U.S. Pat. No. 5,501,893 to Laermer) and need not be described herein in detail. In some embodiments of the present invention, the bulk silicon portion 64 of the proof mass 14 can be etched prior to or during the DRIE step to adjust the thickness of the lower part of the proof mass 14.

Figure 3K:
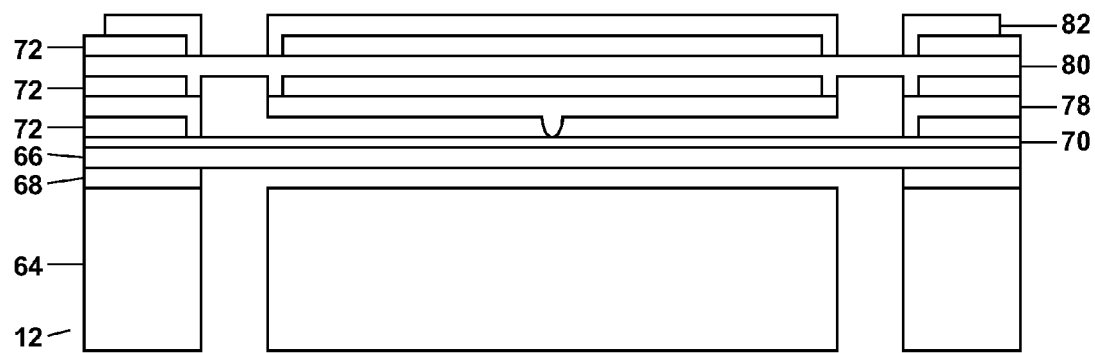

In FIG. 3K, after the DRIE step of FIG. 3J, the sacrificial material 72 can be removed to further separate the proof mass 14 from the remainder of the SOI substrate 12. This can be done using a wet etching step with a selective wet etchant comprising hydrofluoric acid (HF). The HF etchant etches away exposed portions of the sacrificial material 72 and the oxide layer 68 beneath the bridge 18, but does not substantially chemically attack other materials used to form the MEM inertial sensor 10 including the bulk silicon portion 64, the monocrystalline silicon layer 66, and the various layers formed from silicon nitride and polysilicon. A plurality of micron-sized holes (not shown) can be etched through the various polysilicon layers 78, 80 and 82 at locations where underlying sacrificial material 72 is to be removed to expose the sacrificial material 72 to the HF etchant. This wet etching step can proceed for up to several hours or overnight, and can be timed to limit etching of the oxide layer 68.

Figure 3L:
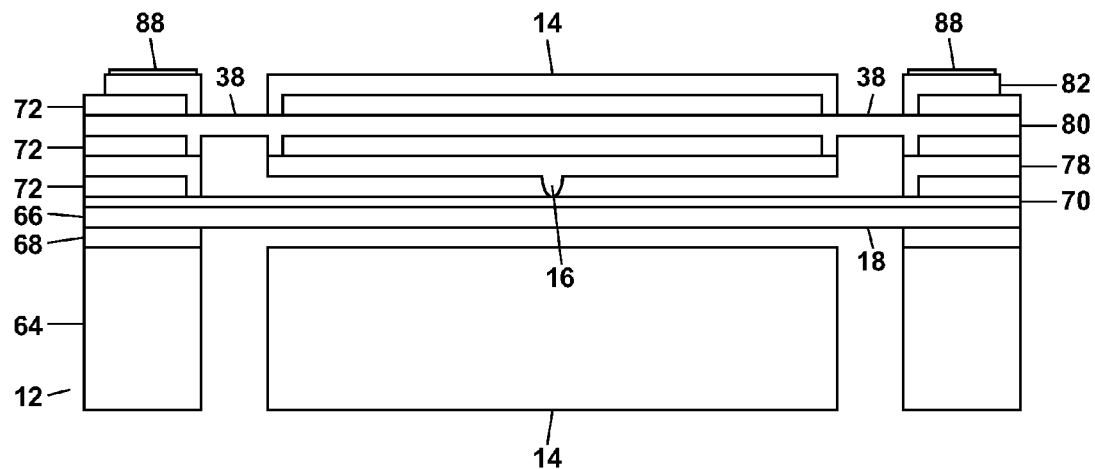

In FIG. 3L, a layer 88 of metal (e.g. gold) can be deposited onto the grating lines of the transmission gratings 24 by evaporation or sputtering. This metal also passes through the elongate openings between the grating lines to coat the underlying surface 30 of the proof mass 14 thereby increasing the reflectivity of the surface 30 to the light 26 from the laser 28. Additionally, this metal layer 88 can also be deposited over the wiring 48, plates 60, contact pads 50, 50', 52, 62 and 62' and probe pads 86 to increase the electrical conductivity of these elements. The metal can be, for example, 100 nanometers (nm) thick and can be patterned by etching or lift-off.

A plurality of fuses 84 (see FIG. 1) can be located about the outer edge 42 of the proof mass 14 to hold the proof mass 14 in place connected to the remainder of the SOI substrate 12 during the removal of the sacrificial material 72 using the selective wet etchant. These fuses 84, which can have two arms arranged in a V-shape and connected to a pair of probe pads 86 on the SOI substrate 12, can be formed from the polysilicon layer 80. Each arm can be, for example, 1 μm wide. To release the proof mass 14 for movement, each fuse 84 can be electrically severed by applying an electrical current between the probe pads 86 for that fuse 84.

The laser 28 and photodetectors 34 associated with each transmission grating can be formed on a separate substrate either as a hybrid device, or as a monolithic device. In some cases, all the lasers 28 and photodetectors 34 needed to form the MEM inertial sensor 10 can be formed on a common substrate to simplify assembly and alignment of the sensor 10. The wavelength of the laser 28 can be, for example, in the range of 0.6-1.6 μm; and the photodetectors 34 are responsive to detect light at the wavelength of the laser 28.

As an example, the laser 28 can comprise a vertical-cavity surface-emitting laser (VCSEL) 28 which can be procured commercially and attached to a semiconductor substrate wherein the photodetectors 34 have been formed with each photodetector 34 having a semiconductor p-i-n junction therein. The photodetectors 34 can comprise silicon photodetectors, or photodetectors formed from III-V compound semiconductor materials (e.g. gallium arsenide, indium gallium arsenide, or indium phosphide).

As another example, the laser 28 and photodetectors 34 can be formed monolithically on a III-V compound semiconductor substrate by epitaxially depositing a plurality of III-V compound semiconductor layers. The III-V compound semiconductor layers can comprise, for example, gallium arsenide (GaAs) and aluminum gallium arsenide (AlGaAs) when the wavelength of the light 26 from the VCSEL 28 is at about 850 nm. The GaAs and AlGaAs layers can be epitaxially grown by metal-organic chemical vapor deposition (MOCVD) or molecular beam epitaxy (MBE) and can be doped n-type or p-type, as needed, during the epitaxial growth. A plurality of alternating layers of GaAs and AlGaAs, each about one-quarter-wavelength (λ/4) thick, can be deposited on a GaAs substrate to form a lower distributed Bragg reflector (DBR) mirror. A quantum-well active region comprising one or more GaAs quantum wells separated by AlGaAs barrier layers and surrounded by compositionally-graded AlGaAs regions can then be epitaxially grown above the lower DBR mirror and doped to form a p-i-n junction about the quantum-well active region. An upper DBR mirror comprising a plurality of alternating GaAs and AlGaAs layers with the same layer thickness as the lower DBR mirror can then be epitaxially grown over the quantum-well active region followed by a GaAs cap layer. Current confinement in the VCSEL 28 can be provided either by proton implantation or by a selective oxidation of the AlGaAs layers in the upper DBR mirror. Further details of VCSEL fabrication can be found, for example, in U.S. Pat. Nos. 5,493,577 and 5,568,499 which are incorporated herein by reference.

The photodetectors 34 can be formed as p-i-n photodetectors. This can be done, for example, by using the above VCSEL structure and etching away the upper DBR mirror surrounding the VCSEL 28 to form the photodetectors 34. Alternately, the photodetectors 34 can be formed as resonant cavity photodetectors by etching away a portion of the upper DBR mirror in the above VCSEL structure. This lowers the reflectivity of the upper DBR mirror and broadens a light absorption band of the p-i-n junction therein. Etching down to the III-V compound semiconductor substrate around the VCSEL 28 and the photodetectors 34 when these elements are formed monolithically can electrically isolate the photodetectors 34 and the VCSEL 28 so that each can be separately contacted. The VCSELs 28 are forward biased with an electrical current to generate the light 26; whereas the photodetectors 34 are reverse biased to detect the diffracted light pattern 32.

In the example of the MEM inertial sensor 10 of FIGS. 1 and 2, the proof mass 14 can have a thickness of, for example, 200-700 μm and a diameter of 0.5 mm to several mm. The lasers 28 and photodetectors 34 can be spaced at a distance of, for example, 0.2-1 mm away from the transmission gratings 24. One or more spacers (not shown) can be used to set the spacing between the lasers 28 and photodetectors 34 and the SOI substrate 12 to form a monolithic unit for the MEM inertial sensor 10. The MEM inertial sensor 10 can also be packaged in a housing under a reduced pressure or vacuum.

Figure 4A:
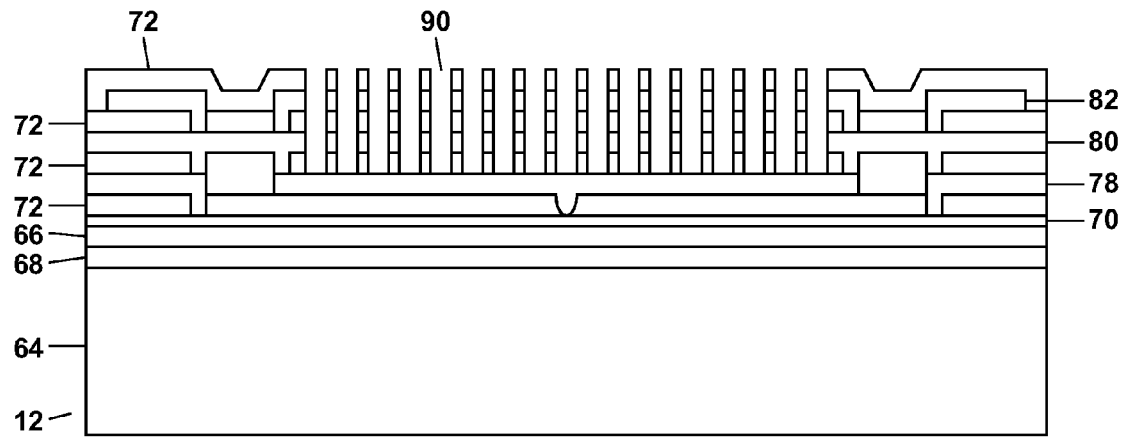
FIGS. 4A and 4B show schematic cross-section views along the section line 2-2 in FIG. 2 to illustrate additional process steps which can be used to increase the mass of the proof mass in each MEM inertial sensor formed according to the present invention.

In certain embodiments of the present invention, the proof mass 14 can be increased beyond that present in the example of FIGS. 1 and 2. This can be done after the step of FIG. 3I by etching a plurality of trenches 90 down through the polysilicon and sacrificial material layers as shown in FIG. 4A. These trenches 90 can be on the order of 1-2 μm wide and can extend down into a top side of the proof mass 14 for a distance of, for example, 6-10 μm. The trenches 90 can comprise, for example, a plurality of annular trenches nested one inside the other, or a plurality of intersecting linear trenches which form a cross-hatched pattern. Etching of the trenches 90 can be performed by a DRIE step either before or after the DRIE step described with reference to FIG. 3J. The trenches 90 can then be filled with a metal or a magnetic material.

As an example, a layer of titanium nitride about 20-50 nm thick can be conformally deposited in the trenches 90 to act as an adhesion layer for in preparation for filling the trenches 90 with tungsten 92. The tungsten 92 can be deposited by CVD at a temperature of about 400° C. Any of the tungsten 92 which is deposited outside of the trenches 90 can be removed using a CMP step. After deposition of the tungsten 92, the MEM inertial sensor 10 can be processed as previously described with reference to FIGS. 3J-3L. The addition of tungsten to the proof mass 14 is useful to increase the mass since the density of tungsten is over eight times the density of silicon.

Figure 5A:
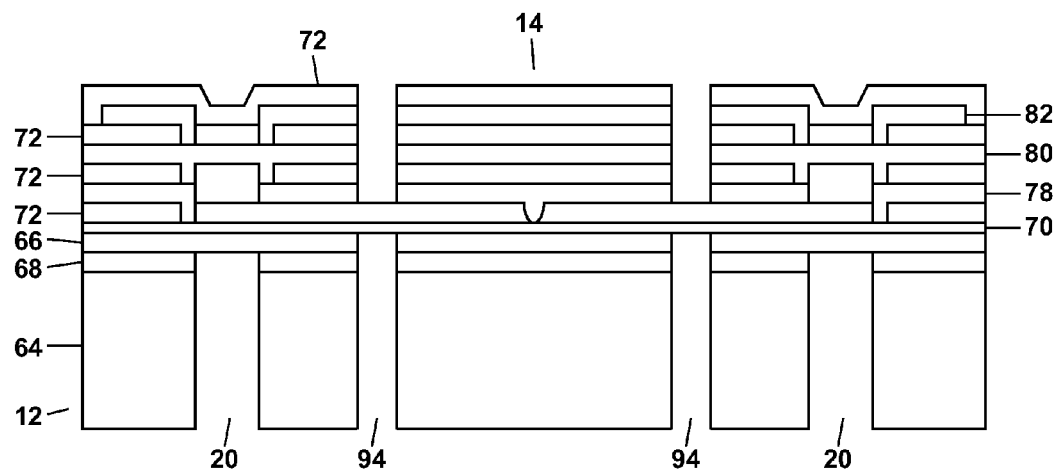
FIGS. 5A and 5B show schematic cross-section views along the section line 2-2 in FIG. 2 to illustrate alternative process steps which can be used to increase the mass of the proof mass in each MEM inertial sensor formed according to the present invention.
Figure 5B:
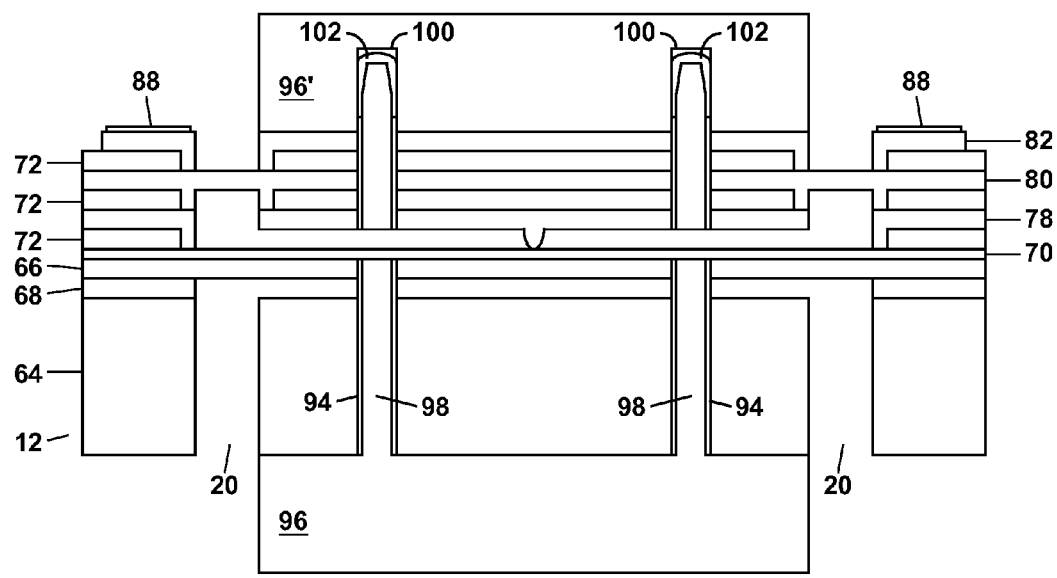

Another way of increasing the mass of the proof mass 14 beyond that shown in FIGS. 1 and 2 is to attach additional material above and below the proof mass 14 as shown in the steps of FIGS. 5A and 5B. This can be done prior to severing the fuses 86 and is useful to locate a center of mass of the proof mass 14 at a pivot point where the pivot 16 contacts the bridge 18.

In FIG. 5A, multiple DRIE steps can be used to etch the opening 20 which defines the shape of the proof mass 14 and also to etch a plurality of openings 94 through the entire proof mass 14 at locations outside of the bridge 18. This can be done by initially etching the openings 94 to a predetermined depth of, for example, 10-50 μm in a first DRIE step; and then etching the openings 20 and 94 in a second DRIE step to a depth corresponding to the thickness of the bulk silicon portion 64 and the oxide layer 68 of the SOI substrate 12. Alternately, an upper part of the openings 94 above the monocrystalline silicon layer 66 can be etched by RIE during patterning of the various material layers above the monocrystalline silicon layer 66 and filled with the sacrificial material 72. A lower part of the openings 94 can then be formed using the same DRIE step used to form the openings 20. When the sacrificial material 72 is removed using the selective wet etching step previously described with reference to FIG. 3K, the sacrificial material 72 filling in the upper part of the openings 94 will also removed to complete the openings 94 through the proof mass 14.

In FIG. 5B, one or more proof mass sections can be attached to the proof mass 14 to increase the mass. These proof mass sections can be separately formed by machining (e.g. laser machining or electrode discharge machining) or by an electroplating process such as LIGA (an acronym based on the first letters of the German words for lithography and electroplating) and can comprise a metal such as tungsten or a magnetic material. In FIG. 5B, a first proof mass section 96 can be provided with a plurality of pins 98 extending outward. The pins 98 can be formed integrally with the first proof mass section 96, or can be inserted into openings formed therein. A second proof mass section 96' can include openings 100 sized to receive the pins 98. The first proof mass section 96 with the attached pins 98 can then be inserted into the openings 94 through the proof mass 14 and mated with the second proof mass section 96'. The proof mass sections 96 and 96' can be attached together, for example, with a low-viscosity adhesive 102 (e.g. an epoxy) inserted into the openings 100.

Figure 4B:
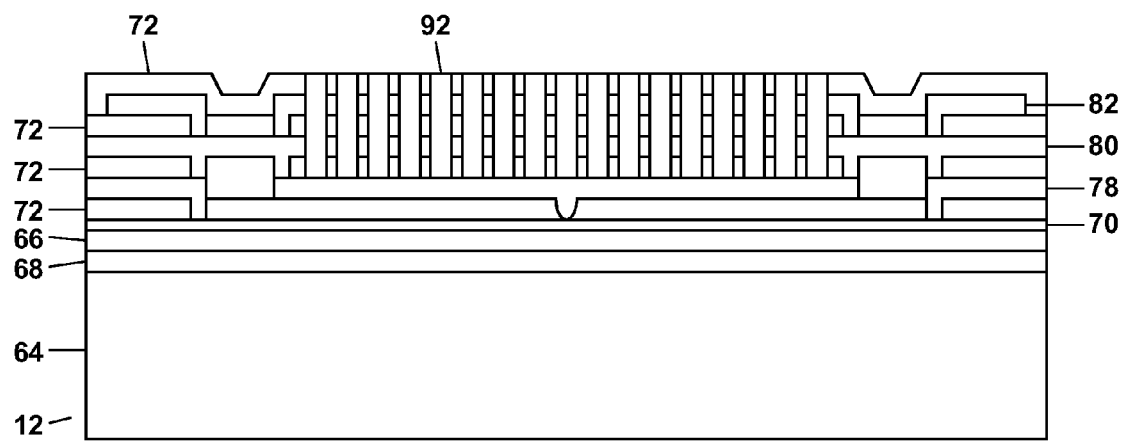
Figure 6:
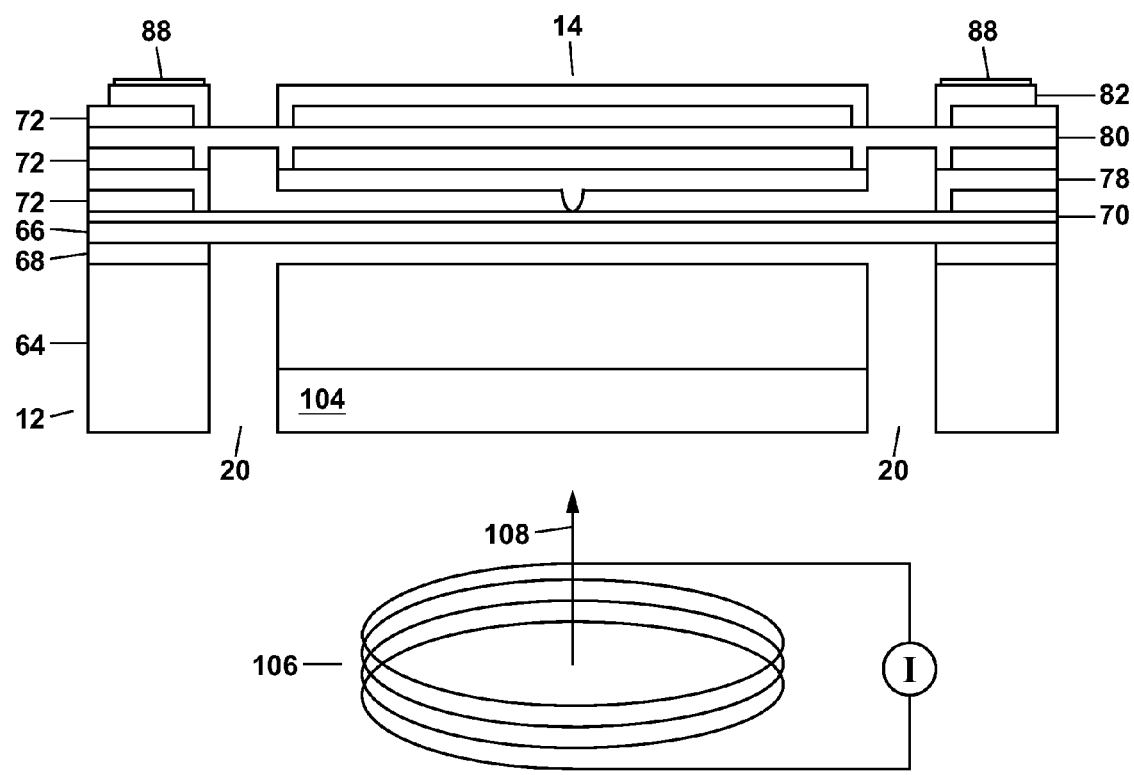
FIG. 6 shows a schematic cross-section view along the section line 2-2 in FIG. 2 to illustrate how a magnetic material can be added to the proof mass to make the proof mass move in response to a magnetic field generated by an electromagnet.

In some embodiments of the present invention, the proof mass 14 can include magnetic material 104 as schematically illustrated in FIG. 6. The magnetic material 104 can comprise a ferromagnetic material (e.g. nickel, nickel-iron, iron-cobalt, or nickel-iron-cobalt) or a rare-earth magnetic material (e.g. neodymium-iron-boron or samarium-cobalt), and can be deposited onto a bottom side of the proof mass 14 as shown in FIG. 6 or attached thereto using an adhesive (e.g. epoxy). Alternately, the magnetic material 104 can be deposited into a plurality of trenches 90 formed in the proof mass 14 as previously described with reference to FIGS. 4A and 4B, or formed as one or both of the proof mass sections 96, 96' previously described with reference to FIGS. 5A and 5B.

The magnetic material 104 can be used either in an unmagnetized state or can be magnetized to form a permanent magnet having a north-south magnetic pole alignment which is aligned along the z-axis 22. An electromagnet 106 located proximate to the magnetic material 104 can be used to provide an externally-applied magnetic field 108 which can interact with the magnetic material 104 to urge the proof mass 14 to move downward or upward along the z-axis 22, as needed, depending upon whether the magnetic material is magnetized and the exact north-south magnetic pole alignment relative to that of the electromagnet 106. An electrical current from a current source I can be used to provide the downward or upward movement of the proof mass 14 and can also be used to periodically modulate the spacing between the proof mass 14 and the transmission gratings 24. Modulating the spacing between the proof mass 14 and the transmission gratings 24 using the electromagnet 106 can provide an alternative to electrostatically modulating this spacing using the parallel-plate electrostatic actuators 58 to allow synchronous detection of the electrical output signal 36 from the photodetectors 34 using a lock-in amplifier. The electromagnet 106 can also be used in a feedback loop to re-balance the proof mass 14 in response to a sensed acceleration which moves the proof mass 14 either upward or downward along the z-axis 22.

Figure 7:
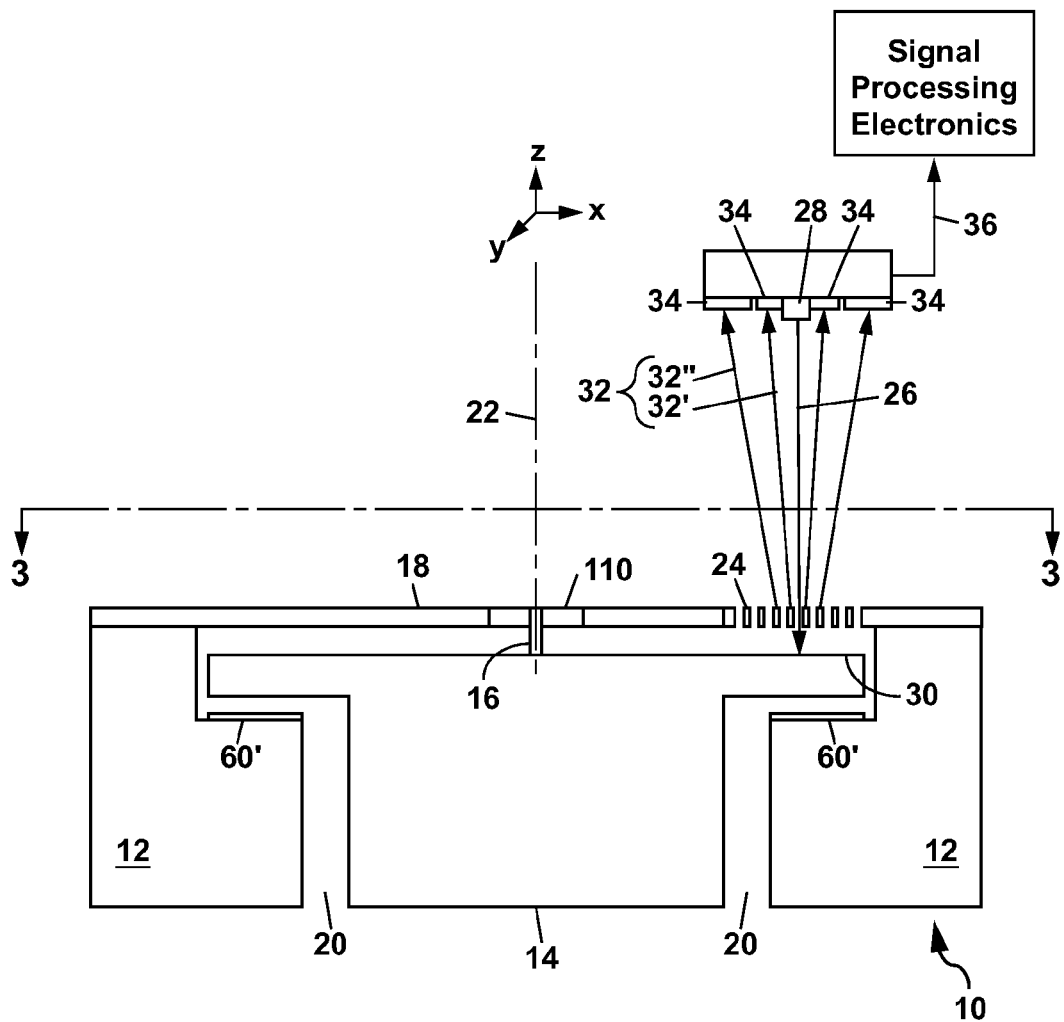
FIG. 7 shows a schematic cross-section view of a second example of the MEM inertial sensor according to the present invention.
Figure 8:
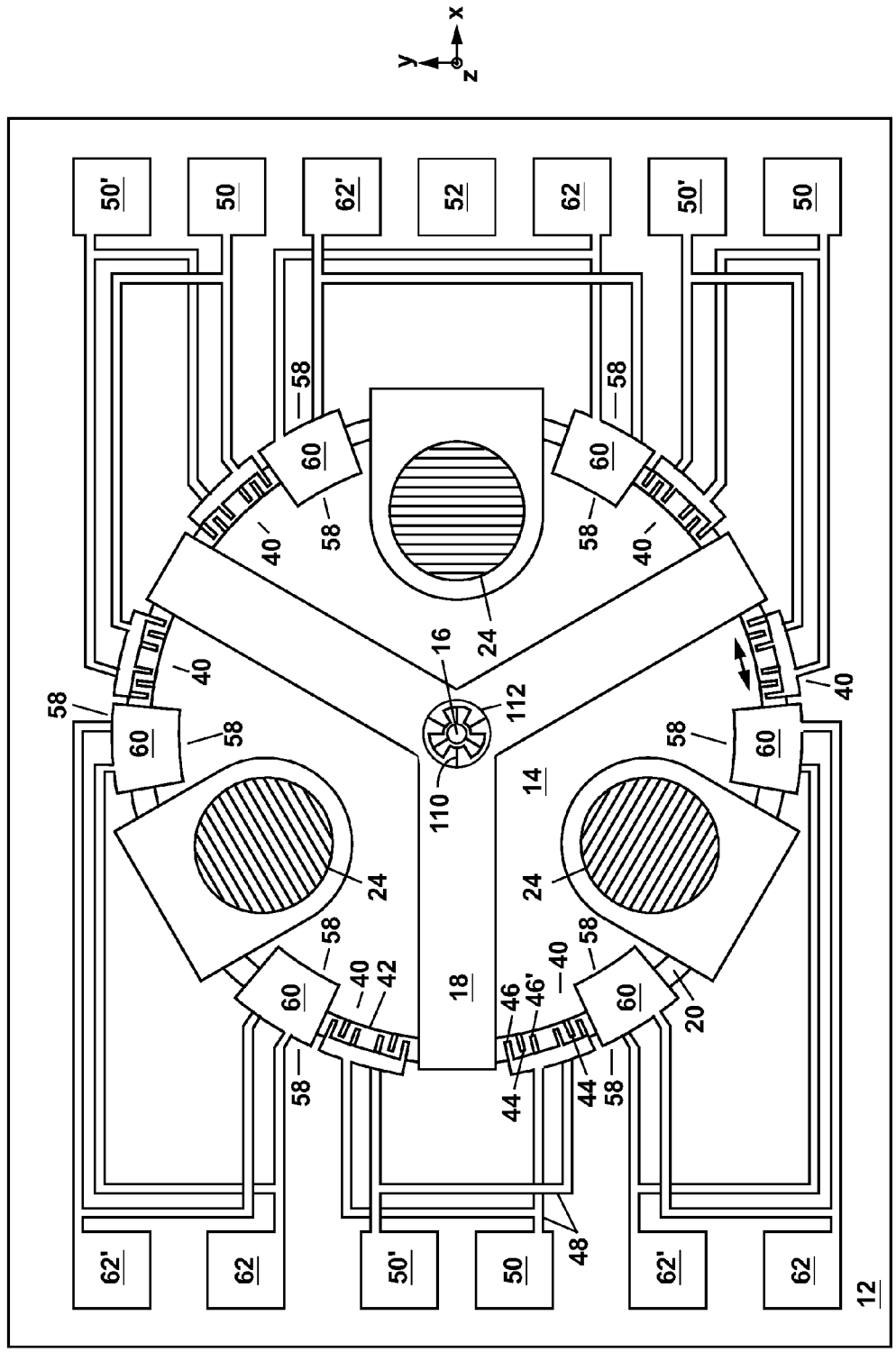
FIG. 8 shows a schematic plan view of the MEM inertial sensor of FIG. 7 along the section line 3-3 in FIG. 7.

FIG. 7 shows a schematic cross-section view of a second example of the MEM inertial sensor 10 of the present invention; and FIG. 8 shows a schematic plan view of this second example of the MEM inertial sensor 10 along the section line 3-3 in FIG. 7. The MEM inertial sensor 10 in FIG. 7 is responsive to measure a linear acceleration along the z-axis 22 and also to measure an angular rotation rate due to a Coriolis acceleration along the x- and y-axes or along an axis anywhere within a plane defined by the x- and y-axes (i.e. in an x-y plane). The electrical output signals 36 from detection of the diffracted light patterns 32 produced by the three transmission gratings 34 spaced about the outer edge 42 of the proof mass 14 in the MEM inertial sensor 10 of FIGS. 7 and 8 can be summed and differenced to determine linear and Coriolis acceleration components of a sensed acceleration, with the Coriolis acceleration components providing an indication of the angular rotation rate about the x- and y-axes.

In this second example of the MEM inertial sensor 10, the proof mass 14 is formed, at least in part, from the substrate 12 which can be a bulk silicon substrate or a SOI substrate. The proof mass 14 is suspended by a pivot 16 which is attached to a bridge 18 which spans an opening 20 formed through the substrate 12. The bridge 18 has a plurality of arms (see FIG. 8) which are connected together proximate to a z-axis 22 of the MEM inertial sensor 10, with the z-axis 22 being centered in the opening 20. The pivot 16 is aligned along the z-axis 22 at a midpoint of the bridge 18.

A plurality of springs 110 extend out radially from the pivot 16 as shown in FIG. 8, and are interconnected together. These springs 110 connect the pivot 16 to the bridge 18 at the location of an opening 112 formed through the bridge 18. This arrangement allows the suspended proof mass 14 to rotate about the z-axis 22 when the proof mass 14 is oscillated in a tangential direction indicated by a double-headed arrow in FIG. 8. This arrangement of the springs 110 also allows the proof mass to move along the z-axis 22 or to tilt at an angle to the z-axis 22 in response to a sensed acceleration.

Oscillation of the proof mass 14 about the z-axis 22 in the tangential direction is provided by a plurality of electrostatic actuators 40 which are located about the outer edge 42 of the proof mass 14. Each electrostatic actuator 40 comprises a plurality of moveable electrodes 44 extending radially outward from the outer edge 42 of the proof mass 14 and located between a pair of stationary electrodes 46 and 46' which are also oriented radially. The moveable electrodes 44 are electrically connected through the proof mass 14, pivot 16, springs 110 and bridge 18 to a ground contact pad 52 on the substrate 12. The stationary electrodes 46 and 46' are connected through electrical wiring 48 on the substrate 12 to separate contact pads 50 and 50'. This allows a voltage to be sequentially applied between the stationary electrodes 46 and 46' and the moveable electrodes 44 to urge the proof mass 14 to oscillate back and forth in the tangential direction, with the movement of the proof mass 14 in each direction being, for example, about 1 μm.

A plurality of parallel-plate electrostatic actuators 58 can also be spaced about the outer edge 42 of the proof mass 14 as shown in FIG. 8. These actuators 58 can be used to adjust a spacing between the proof mass 14 and the transmission gratings 24. Each parallel-plate electrostatic actuator 58 comprises an electrically-conductive plate 60 located above the proof mass 14 and another plate 60' (see FIG. 7) which is located below the proof mass 14. The plates 60 and 60' can be formed of polysilicon and/or metal, with each plate 60 and 60' being connected through wiring 48 to a different contact pad 62 or 62' as shown in FIG. 8. This arrangement allows each pair of the plates 60 and 60' connected to a particular contact pad 62 or 62' to be operated independently in response to a voltage applied between that pair of the plates 60 or 60' and the proof mass 14 which is electrically grounded.

The parallel-plate electrostatic actuators 58 in the MEM inertial sensor 10 of FIGS. 7 and 8 can be used to electrostatically move the proof mass 14 upward or downward, as needed, to adjust the spacing between each transmission grating 24 and the proof mass 14 to set an operating point for each transmission grating 24 where the change in the diffraction light pattern 32 with a sensed acceleration is most sensitive and substantially linear (e.g. to set the spacing to be an odd multiple of $\lambda/8$). An ac voltage can also be applied to the plates 60 or 60' as previously discussed to modulate the spacing for synchronous detection of the electrical output signals 36 using a lock-in amplifier. The parallel-plate electrostatic actuators 58 can also be used with closed loop feedback to re-balance the proof mass 14 after any movement of the proof mass 14 in response to a sensed acceleration.

The MEM inertial sensor 10 of FIGS. 7 and 8 can be operated with three sets of lasers 28 and photodetectors 34, with each set of the lasers 28 and photodetectors 34 being positioned above one of the transmission gratings 24 as shown in FIG. 7. Light 26 from each laser 28 is incident onto one of the transmission gratings 24 and is partially transmitted through that grating 24 to the underlying proof mass 14. A portion of the light 26 which is reflected off of each transmission grating 24 interferes with another portion of the light 26 which is reflected off of the surface 30 of the proof mass 14 to generate a diffracted light pattern 32 which can consist of a 0-th order component 32' and/or a higher-order diffracted light component 32" as previously described with reference to FIG. 1.

The diffracted light pattern 32 can be detected with photodetectors 34 to generate electrical output signals 36. These electrical output signals 36 can be processed using signal processing electronics which can include a lock-in amplifier. An output of the lock-in amplifier can be amplified, as needed, and fed back to the parallel-plate electrostatic actuators 58 in response to a sensed acceleration to re-balance (i.e. null) the position of the proof mass 14 in response to the sensed acceleration. The output of the lock-in amplifier can also be used to provide an indication of the linear acceleration and/or angular rotation rate of the MEM inertial sensor 10. Measurement of an angular rotation rate with the MEM inertial sensor 10 in FIGS. 7 and 8 is possible due to the oscillation of the proof mass 14 which generates a Coriolis acceleration in response to any rotation of the MEM inertial sensor 10, with the Coriolis acceleration tilting the proof mass 14 at an angle to the z-axis 22 by an amount which is proportional to the angular rotation rate of the sensor 10.

Multiple MEM inertial sensors 10 can be provided on a common substrate 12 with different orientations to allow a cross-correlation of the processed electrical output signals 34 from the individual sensors 10, or to form an inertial measurement unit capable of measuring the linear acceleration and angular rotation rate in any direction. Alternately, multiple MEM inertial sensors 10 can be used to sense the angular rotation rate about one or more of the x-, y-, and z-axes, with the linear acceleration along each axis being measured by a conventional linear accelerometer.

The MEM inertial sensor 10 in FIGS. 7 and 8 can be fabricated in a manner similar to that previously described with reference to FIGS. 3A-3L. The proof mass 14 can be formed from a part of the substrate 12 and can include additional layers 70 and 78, and encapsulated layers of a sacrificial material 72 as has been described previously with reference to FIGS. 3A-3D. The layers 78, 80 and 82 can be used to build up the electrostatic actuators 40 as described previously for the first example of the MEM inertial sensor 10, with the polysilicon layers 80 and 82 being used to form the pivot 16 in FIGS. 7 and 8. The bridge 18, transmission gratings 24, plates 60 and springs 110 in the example of FIGS. 7 and 8 can all be formed from the polysilicon layer 82. Additionally, a plurality of fuses 84 and probe pads 86, which have been omitted from FIG. 8 for clarity, can be formed from the polysilicon layers 80 and 82, respectively. The plates 60' can be formed from a first-deposited polysilicon layer which can be, for example, 0.3 µm thick. The lasers 28 and photodetectors 34 can be formed as described previously with reference to the first example of the MEM inertial sensor 10 in FIGS. 1 and 2.

The mass of the proof mass 14 in this second example of the MEM inertial sensor 10 can be increased, if needed, by the addition of tungsten or another metal as previously described with reference to FIGS. 4 and 5. Additionally, the second example of FIGS. 7 and 8 can optionally include a magnetic material 104 as described with reference to FIG. 6 to allow modulation of the spacing between the proof mass 14 and the transmission gratings 24, or to allow the use of a magnetic force re-balancing in response to a sensed acceleration to extend the dynamic range of the MEM inertial sensor 10.

Figure 9:
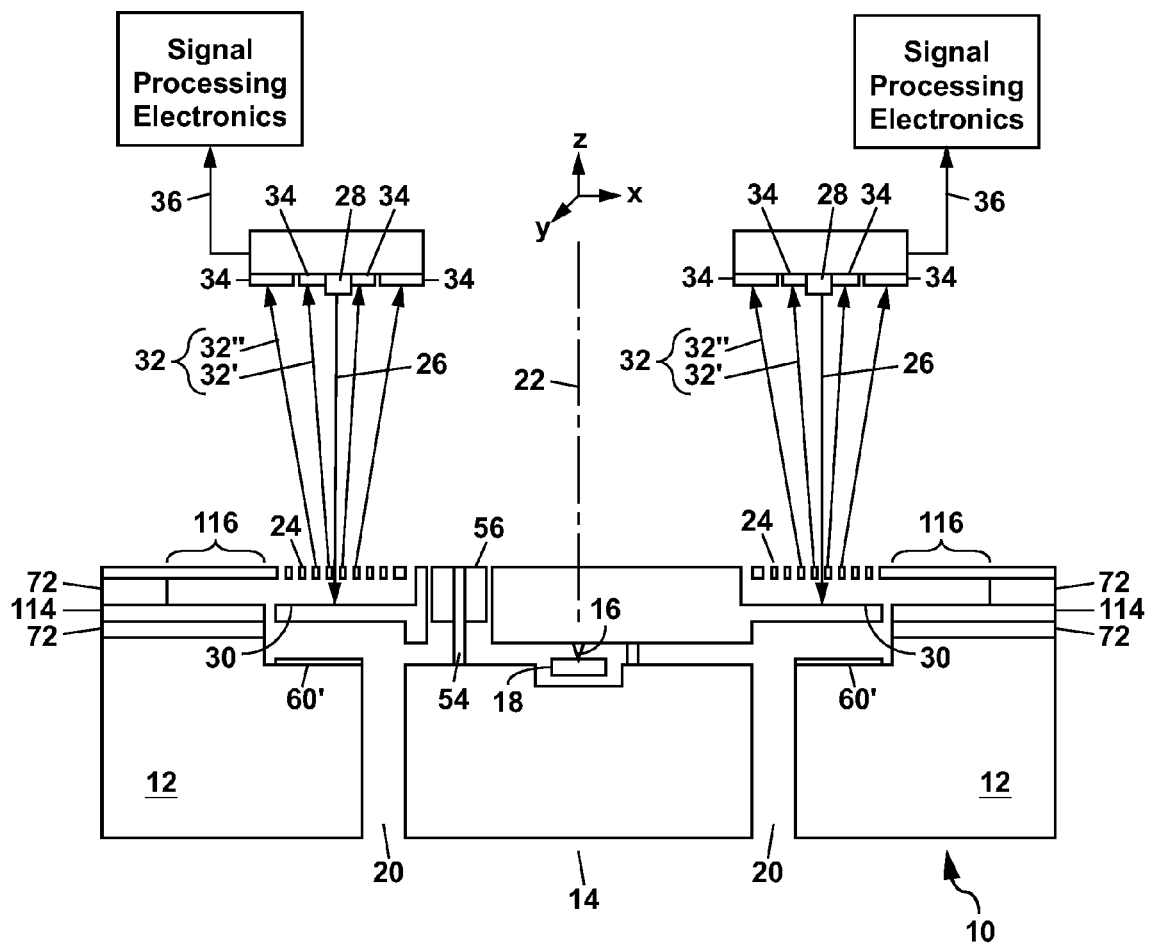
FIG. 9 shows a schematic cross-section view of a third example of the MEM inertial sensor according to the present invention which is similar to FIG. 1 except for having an electrostatic actuator located beneath each transmission grating to move that transmission grating independently of the proof mass.

FIG. 9 shows a schematic cross-section view of a third example of the MEM inertial sensor 10 of the present invention. This example of the MEM inertial sensor 10 is similar to that of FIGS. 1 and 2, but includes an additional electrode 114 located beneath a cantilevered portion 116 of each transmission grating 24 but does not extend beneath the grating lines. The electrode 114 beneath each transmission grating 24, allows that transmission grating 24 to be moved independently of the proof mass 14. The electrode 114 can be connected through wiring 48 to a contact pad on the substrate 12.

In the third example of the MEM inertial sensor 10, the electrodes 114 can be formed, for example, from one or more of the polysilicon layers and can be electrically insulated from the substrate 12 and from the transmission gratings 24 (e.g. by layers of the sacrificial material 72). As an example, the electrodes 114 can be formed in the polysilicon layer 80 to provide a spacing of about 2 µm between the electrodes 114 and the transmission gratings 24 which can be formed from the polysilicon layer 82. To move each transmission grating 24 and thereby change the spacing between that transmission grating 24 and the proof mass 14, a voltage can be applied between the electrode 114 and that transmission grating 24, with the transmission grating 24 being electrically grounded. This voltage, which can be a dc voltage and/or an ac voltage, will generate an electrostatic force of attraction that will urge the transmission grating 24 to move towards the electrode 114, thereby changing the spacing between the transmission grating 24 and the proof mass 14. With the transmission gratings 24 and the proof mass 14 both electrically grounded, no electrostatic force will be produced between these two elements so that they can be moved independently of each other. As described previously, the proof mass 14 can be moved up and down along the z-axis 22 either electrostatically using the parallel-plate electrostatic actuators 58 or magnetically using the electromagnet 106 while, at the same time being oscillated in the tangential direction about the z-axis 22 using the electrostatic actuators 40.

Although this third example of the MEM inertial sensor 10 has been described with a structure similar to that of the first example of FIGS. 1 and 2 except for the additional electrodes 114, those skilled in the art will understand that the electrodes 114 can also be added to the other examples of the MEM inertial sensor 10 described herein and, in particular, to the second example of the MEM inertial sensor 10 in FIGS. 7 and 8.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A micro electromechanical (MEM) inertial sensor, comprising:
   a substrate;
   a bridge which extends across an opening formed through the substrate;
   a proof mass located in the opening and formed, at least in part, from the substrate;
   a pivot located between the proof mass and the bridge to support the proof mass at a midpoint of the bridge;
   at least one transmission grating located proximate to the proof mass near an outer edge thereof;
   at least one, each laser corresponding to one of the at least one transmission grating to provide light which is transmitted through the one corresponding transmission grating and reflected off of a surface of the proof mass to generate a diffracted light pattern which changes with a movement of the proof mass in response to a sensed acceleration directed along a z-axis perpendicular to the substrate or at an angle to the z-axis; and
   at least one plurality of photodetectors, each plurality of photodetectors located proximate to one of the at least one laser to detect the diffracted light pattern corresponding to that laser and to generate electrical output signals to provide an indication of the sensed acceleration.

2. The apparatus of claim 1 wherein the substrate comprises silicon.

3. The apparatus of claim 1 wherein the substrate comprises a silicon-on-insulator (SOI) substrate.

4. The apparatus of claim 1 further comprising a plurality of electrodes located above and below the proof mass proximate to the outer edge thereof to provide electrostatic forces to urge the proof mass to move upward or downward.

5. The apparatus of claim 1 further comprising a plurality of electrostatic actuators located about the outer edge of the proof mass to urge the proof mass to oscillate about the z-axis in a tangential direction.

6. The apparatus of claim 1 further comprising an electrode located beneath each transmission grating to electrostatically change a spacing between that transmission and the proof mass in response to a voltage applied between the transmission grating and the electrode located therebeneath.

7. The apparatus of claim 1 wherein the proof mass further comprises tungsten.

8. The apparatus of claim 1 wherein the pivot is tapered at an end thereof which contacts the bridge.

9. The apparatus of claim 8 wherein the bridge comprises a layer of silicon nitride which is in contact with the tapered end of the pivot.

10. The apparatus of claim 1 wherein one end of the pivot is attached to the bridge and another end of the pivot is attached to the proof mass by a plurality of springs.

11. The apparatus of claim 1 wherein each of the at least one laser comprises a vertical-cavity surface-emitting laser.

12. The apparatus of claim 1 wherein the proof mass includes a magnetic material which is responsive to an externally-applied magnetic field to move the proof mass.

13. The apparatus of claim 12 wherein the externally-applied magnetic field is produced by an electromagnet located proximate to the magnetic material.

14. A microelectromechanical (MEM) inertial sensor, comprising:
   a substrate having an opening therethrough;
   a bridge extending across the opening;
   a proof mass suspended in the opening by a pivot which contacts a midpoint of the bridge, with the pivot being aligned along a z-axis which is perpendicular to the substrate;
   at least one electrostatic actuator located proximate to an outer edge of the proof mass to provide an oscillatory motion of the proof mass about the z-axis in a tangential direction;
   a plurality of transmission gratings located proximate to the proof mass near the outer edge thereof;
   a laser to provide light which is transmitted through each transmission grating and reflected off of the proof mass to produce a diffracted light pattern which changes with a movement of the proof mass in response to a sensed acceleration; and a plurality of photodetectors to detect the diffracted light pattern and thereby generate electrical output signals to provide an indication of the sensed acceleration.

15. The apparatus of claim 14 wherein the substrate comprises silicon.

16. The apparatus of claim 15 wherein the proof mass is formed, at least in part, from the substrate, and further comprises tungsten.

17. The apparatus of claim 14 wherein the pivot is tapered at an end thereof which contacts the midpoint of the bridge.

18. The apparatus of claim 14 wherein the pivot is attached to the proof mass by a plurality of springs.

19. The apparatus of claim 14 further comprising a plurality of electrodes located above and below the proof mass proximate to the outer edge thereof to provide electrostatic forces to urge the proof mass to move upward or downward.

20. The apparatus of claim 14 wherein the proof mass includes a magnetic material which is responsive to an externally-applied magnetic field to urge the proof mass to move along the z-axis.

21. A microelectromechanical (MEM) inertial sensor, comprising:
   a proof mass formed, at least in part, from a portion of a substrate, with the proof mass being centered about a z-axis which is perpendicular to the substrate, and with the proof mass being moveable along the z-axis or at an angle thereto in response to a sensed acceleration, and with the proof mass being supported by a bridge which spans an opening through the substrate and by a pivot which is located between the bridge and the proof mass and aligned along the z-axis;
   a plurality of-transmission gratings located proximate to an outer edge of the proof mass and uniformly spaced around the outer edge;
   a plurality of parallel-plate electrostatic actuators spaced about the proof mass to electrostatically adjust a spacing between the proof mass and the plurality of transmission gratings;

a plurality of electrostatic actuators located proximate to the outer edge of the proof mass to oscillate the proof mass about the z-axis in a tangential direction;

a plurality of lasers, with each laser providing light which is transmitted through one of the transmission gratings and reflected off of the proof mass to generate a diffracted light pattern which changes with a movement of the proof mass in response to the sensed acceleration; and a plurality of photodetectors to detect each diffracted light pattern to generate therefrom electrical output signals wherefrom the sensed acceleration can be determined.

22. The apparatus of claim 21 wherein the substrate comprises silicon.

* * * * *